United States Patent
Ackerman et al.

(10) Patent No.: US 7,160,070 B2
(45) Date of Patent: Jan. 9, 2007

(54) BARRIER NET

(75) Inventors: David Ackerman, Dorchester (GB); Stephen Robert Carden, Bridport (GB); Stephen Mark Trafford, Lyme Regis (GB); John William Startup, Somerset (GB)

(73) Assignee: Amsafe Bridport Limited, Dorset (GB)

( * ) Notice: Subject to any disclaimer, the term of this patent is extended or adjusted under 35 U.S.C. 154(b) by 0 days.

(21) Appl. No.: 11/034,530

(22) Filed: Jan. 12, 2005

(65) Prior Publication Data

US 2005/0163583 A1     Jul. 28, 2005

Related U.S. Application Data

(63) Continuation of application No. PCT/GB03/03169, filed on Jul. 23, 2003.

(30) Foreign Application Priority Data

Jul. 26, 2002  (GB)  ................................ 0217423.3

(51) Int. Cl.
*B60P 7/08*     (2006.01)

(52) U.S. Cl. ........................ 410/118; 410/97

(58) Field of Classification Search ............ None
See application file for complete search history.

(56) References Cited

U.S. PATENT DOCUMENTS

| 2,669,402 | A | * | 2/1954 | Del Mar .................... 410/118 |
| 3,294,034 | A | * | 12/1966 | Bodenheimer et al. ........ 410/1 |
| 3,486,723 | A | | 12/1969 | Harrison |
| 5,915,652 | A | | 6/1999 | Caldwell |
| 6,244,803 | B1 | | 6/2001 | Parish |
| 6,435,786 | B1 | * | 8/2002 | Breckel et al. ............. 410/118 |
| 2004/0240959 | A1 | * | 12/2004 | Ackerman et al. .......... 410/118 |

FOREIGN PATENT DOCUMENTS

WO    WO 03/062054    *    7/2003

* cited by examiner

*Primary Examiner*—Stephen Gordon
(74) *Attorney, Agent, or Firm*—Sturm & Fix LLP

(57) ABSTRACT

A barrier net across a space defined by the fuselage of an aircraft and a floor of the aircraft comprises a plurality of intersecting net members, at least some of the members being attached to the fuselage by attachment structures attached to attachment points on the fuselage of the aircraft and held forward of the attachment points so that a major portion of the net is in a plane further forward than the attachment points.

13 Claims, 1 Drawing Sheet

BARRIER NET

CROSS REFERENCE TO RELATED APPLICATIONS

This application is a Continuation of PCT Application No. PCT/GB03/03169 filed Jul. 23, 2003, claiming priority of UK Application No. 0217423.3 filed Jul. 26, 2002, which is included in its entirety by reference made hereto.

BACKGROUND OF THE INVENTION

1. Field of the Invention

The present invention relates to a barrier net across a space defined by the fuselage of an aircraft, for example for restraining the movement of cargo in the fuselage of an aircraft.

2. Description of Related Art

Barrier nets formed from webbing or rope type textile elements are commonly used to act as emergency restraints for the payload on freighter aircraft in the event of an emergency landing. Typically, they have to restrain a forward loading based on the payload mass multiplied by a 9 g forward acting inertial factor. This generates extremely large forces within the barrier net, which, in turn, are transmitted into the aircraft structure to which the barrier net attaches.

It is in the nature of textiles, that loads can only be transmitted by way of tensile forces along the elements, because these have no strength in shear or compression. In order for an element to react to a loading imposed at right angles to it, as the initial loading on a barrier net would be, it must deflect in the direction of the applied load such that, at equilibrium, the summation of the forward load components of the tension loads in the net at each attachment equals the applied load. Clearly, the more a net deflects, the closer the elements at the attachments will rotate to approach the direction of the applied load and the lower the tension in those elements would have to be for a given forward load component; the tension being equivalent to the load vector tangential to the net member at the attachment. This would translate into a design philosophy to allow for as much deflection as possible in order to keep the internal tensions in the net as low as possible, thus requiring lower strength elements, which would generally mean that less material need be used, leading to a lighter and cheaper product.

However, operational and space constraints on the aircraft normally dictate that barrier net deflections must be kept as small as possible, thus conflicting with the above philosophy. Unfortunately, restricting the deflection of the barrier net not only implies a heavier net, or the use of more sophisticated 'low elongation' materials, but it also increases the radial components of the tension loads at the attachments, which then take on an increasing significance. In addition to restricting the allowable net deflection, the aircraft manufacturer may also impose a radial load limit on the attachments. Often, it is extremely difficult to balance these conflicting requirements in the net design.

It is an object of the present invention to go at least some way towards overcoming the disadvantages of the prior art devices, or at least to provide an acceptable alternative to the prior art devices.

BRIEF SUMMARY OF THE INVENTION

According to the present invention there is provided a barrier net across a space defined by the fuselage of an aircraft comprising a plurality of intersecting net members and capable of restraining a load up to a maximum amount, at least some of the members being:
(i) attached to the fuselage by attachment means attached to attachment points on the fuselage; and
(ii) held to the fuselage forward of their respective attachment points by holding means so that a major portion of the net is in a plane further forward than the attachment points, the arrangement being such that said holding means will not break away from the fuselage in the event of a load on said net up to said maximum amount.

This has the effect of modifying the net profile, as it allows the net members at the attachment points to lie more in line with the forward direction of the applied load and, as outlined above, have a lower tension under loading and impose a lower radial load component on the attachments.

The said maximum amount is the maximum load which the net is designed to withstand, either because of restrictions on the loading which the net members can withstand or because of restrictions on the radial load at the attachment points.

It is preferred that the holding means comprises further attachment means, provided for at least some of the net members, attached to further attachment points oil the fuselage located forward of the first-mentioned attachment points. The further attachment points should be sufficiently strong such that they will not break away from the fuselage in the event of a load on the net up to the maximum amount.

This has the effect of sharing the attachment loads between frames and, thus, keeping any potentially high radial load components to manageable levels.

When the holding means comprises the use of further attachment means it is preferred that at least some of the further attachment means comprise shackles and more preferred that at least some of the further attachment means comprise quick release fastenings.

In an alternative embodiment of the present invention the holding means may comprise fixed length members located on the fuselage forward of the first-mentioned attachment points and adapted to engage at least some of the net members. The further attachment points should be sufficiently strong such that they will not break away from the fuselage in the event of a load on the net up to the maximum amount.

The fixed length members may be either fixed length material straps or they may be fixed length rigid rod members.

It is preferred that the fixed length members have openings through which the net members pass. This configuration allows the further attachment point to act as a free running interface. The net profile is altered as in the first embodiment but the net member is not physically attached to the further attachment point, rather it is simply "held" in the forward plane. This enables the net member to slide freely through the further attachment points unhindered.

It is preferred that at least some of the first-mentioned attachment means comprise shackles and more preferred that at least some of the first mentioned attachment means comprise quick release fastenings.

The net members may suitably be constructed from lengths of textile webbing, rope, plastics fibre material, metallic fibre cables or a combination thereof.

For a better understanding of the present invention, reference will now be made to the accompanying drawings showing, by way of example, two examples of the present invention, in which:

BRIEF DESCRIPTION OF THE DRAWINGS

In the drawings like or equivalent parts are referenced with the same reference numerals.

FIG. 1 shows a schematic representation of an overhead view of one embodiment of a loaded barrier net 1 according to the present invention. This shows the profile of the barrier net 1 under the loading of a typical payload. The configuration of the barrier net 1 may be one of a number as known in the art. For example, the barrier net 1 may be in the form of a rectangular grid net, a "spider web" configuration or in the form of a "diamond grid" net as described in UK Patent Application No. 0201752.3.

Figure 1:
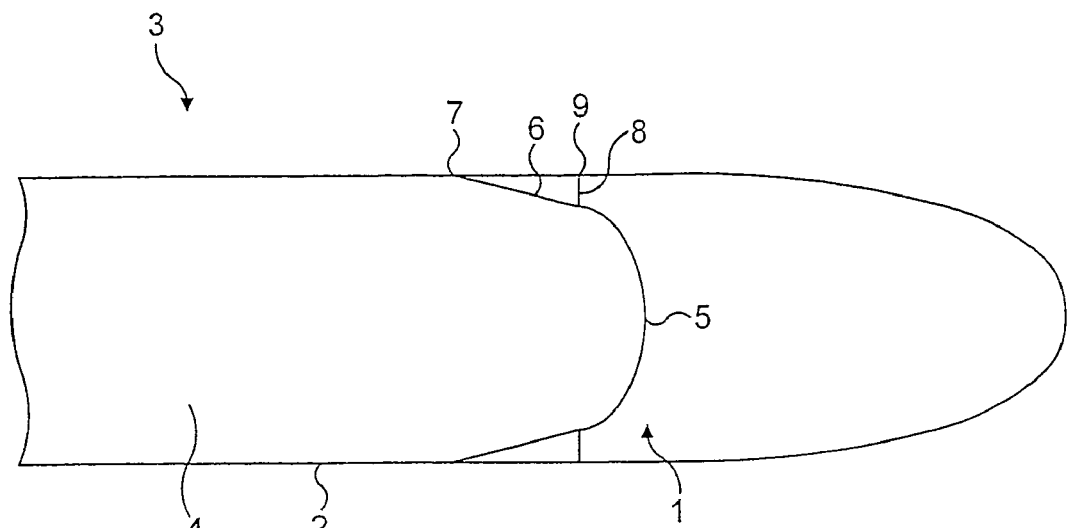
FIG. 1 is a schematic representation of an overhead view of one embodiment of a loaded barrier net according to the present invention.

The barrier net 1 is rigged across the space defined by the fuselage 2 of an aircraft 3 and a floor 4 of the aircraft 3. The barrier net 1 comprises a plurality of intersecting net members 5 (only one shown) having first attachment means 6 at each end attached to first attachment points 7 on the fuselage 2. The first attachment means 6 comprises a length of net material and a securing means e.g. a shackle (not shown). It is not necessary for the first attachment means 6 to be made of the same material as the net member and it may conveniently be an additional length of material attached to the net member by suitable means or a rigid member attached to the net member by suitable means.

The net member 5 additionally comprises further attachment means 8 attached to further attachment points 9 located further forward in the fuselage 2 than the first attachment points 7. The further attachment means 8 comprises a length of net material, which may or may not be the same material as the net member 5, and a securing means e.g. a shackle (not shown). As with the first attachment means 6, the further attachment means 8 may also be a rigid member attached to the net member 5 by suitable means. The lengths of the first attachment means 6 and the further attachment means 8 can be adjusted in order to control the forward and radial components of the load vector to ensure that they remain within certain predetermined values.

The result of the further attachment means 8 being attached to the further attachment points 9 is that the profile of the barrier net 1 is modified as compared to that of a conventional barrier net. The profile of the first attachment means 6 is modified to lie more in line with the forward direction of the applied load and the major portion of the barrier net 1 is in a plane further forward than the first attachment points 7. This results in a lower tension in the first attachment means 6 and the further attachment means 8 for a given forward load as compared with the tension experienced in a single attachment means such as is known in the art.

Figure 2:
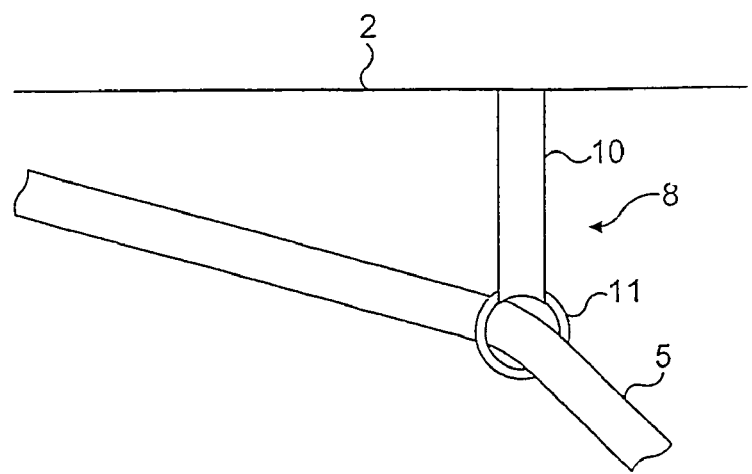
FIG. 2 is a view of a forward attachment point of a second embodiment of a barrier net according to the present invention.

FIG. 2 shows an alternative embodiment of the further attachment means 8. The further attachment means 8 comprises a fixed length member 10 attached to the aircraft fuselage 2 at a point forward of the first mentioned attachment points 7 (not shown) and which supports a ring member 11 at its free end. The fixed length member 10 may be either a fixed length of material or it may be a fixed length rigid member. The fixed length member 10 is securely anchored on the fuselage 2.

The net member 5 extends across the space defined by the fuselage 2 and the floor 4 and engages with the ring member 11 of the further attachment means 8. The net member 5 passes through the ring member 11 and is attached to the first attachment point 7 (not shown) as before. This has the effect of modifying the net profile but also enables the further attachment means 8 to act as a free running interface through which the net member 5 may slide in use.

The invention claimed is:

1. A barrier net across a space defined by the fuselage of an aircraft comprising a plurality of intersecting net members and capable of restraining a load up to a maximum amount, at least some of the members being:
   (i) attached to the fuselage by attachment means attached to attachment points on the fuselage; and
   (ii) held to the fuselage forward of their respective attachment points by holding means so that a major portion of the net is in a plane further forward than the attachment points, the holding means being configured such that they will not break away from the fuselage in the event of a load on said net up to said maximum amount.

2. A barrier net according to claim 1, wherein the holding means comprises further attachment means, provided for at least some of the net members, attached to further attachment points located forward of the first-mentioned attachment points.

3. A barrier net according to claim 2, wherein at least some of the further attachment means comprise shackles which engage with the further attachment points.

4. A barrier net according to claim 2, wherein at least some of the further attachment means comprise quick release fastenings.

5. A barrier net according to claim 1, wherein the holding means comprises fixed length members located on the fuselage forward of the attachment points and adapted to engage at least some of the net members.

6. A barrier net according to claim 1, wherein each of the fixed length members comprises a rigid rod.

7. A barrier net according to claim 5, wherein each of the fixed length members has an opening through which the net member passes.

8. A barrier net according to claim 1, wherein at least some of the attachment means comprise shackles which engage with the attachment points.

9. A barrier net according to claim 1, wherein at least some of the first-mentioned attachment means comprise quick release fastenings.

10. A barrier net according to claim 1, wherein at least some of the plurality of net members comprise lengths of textile webbing.

11. A barrier net according to claim 1, wherein at least some of the plurality of net members comprise lengths of rope.

12. A barrier net according to claim 1, wherein at least some of the net members comprise lengths of plastics fibre material.

13. A barrier net according to claim 1, wherein at least some of the net members comprise lengths of metallic fibre cables.

* * * * *